(12) United States Patent
Portman et al.

(10) Patent No.: US 8,743,867 B2
(45) Date of Patent: Jun. 3, 2014

(54) SYSTEM AND METHOD FOR TRANSFERRING INTERACTION METADATA MESSAGES OVER COMMUNICATION SERVICES

(75) Inventors: Leon Portman, Rishon Lezion (IL); Stas Margolis, Alfei Menashe (IL); Noam Ben Zeev, Tel Aviv (IL); Shay Weiss, Ra'anana (IL)

(73) Assignee: Nice-Systems Ltd., Ra'anana (IL)

( * ) Notice: Subject to any disclaimer, the term of this patent is extended or adjusted under 35 U.S.C. 154(b) by 1473 days.

(21) Appl. No.: 11/878,453

(22) Filed: Jul. 24, 2007

(65) Prior Publication Data
US 2009/0028132 A1  Jan. 29, 2009

(51) Int. Cl.
*H04L 12/66* (2006.01)
(52) U.S. Cl.
USPC .......................... 370/352; 370/466; 379/88.17
(58) Field of Classification Search
USPC ........................................................ 379/88.17
See application file for complete search history.

(56) References Cited

U.S. PATENT DOCUMENTS

| | | | | |
|---|---|---|---|---|
| 6,895,438 B1* | 5/2005 | Ulrich | ........................... | 709/227 |
| 6,937,706 B2* | 8/2005 | Bscheider et al. | ........ | 379/88.22 |
| 6,985,943 B2* | 1/2006 | Deryugin et al. | ............. | 709/224 |
| 2001/0055372 A1* | 12/2001 | Glowny et al. | ............ | 379/88.22 |
| 2004/0076178 A1* | 4/2004 | Botton | ........................... | 370/466 |
| 2006/0031510 A1* | 2/2006 | Beck et al. | ..................... | 709/226 |
| 2006/0203807 A1* | 9/2006 | Kouretas et al. | .............. | 370/352 |
| 2006/0209797 A1* | 9/2006 | Anisimov et al. | ............. | 370/352 |
| 2008/0086564 A1* | 4/2008 | Putman et al. | ................ | 709/227 |
| 2008/0222240 A1* | 9/2008 | Deryugin et al. | ............. | 709/202 |
| 2009/0245482 A1* | 10/2009 | Galvin | ....................... | 379/88.04 |

OTHER PUBLICATIONS

"Application Session Services" Standard ECMA-354 1st Edition, Jun. 2004, p. i, 1-19 http://www.ecma-international.org/publications/standards/Ecma-354.htm.
WS-Session-Web Services for Application Session Services Standard ECMA-366 1st Edition, Jun. 2005 p. I, 1-19, http:/www.ecma-international.org/publications/standards/Ecma-366.htm.
"Web Services Description Language (WSDL) for CSTA Phase III" Standard ECMA-348 3rd Edition, Dec. 2006, p. i-iv, 1-209, http://www.ecma-international.org/publications/standards/Ecma-348.htm.
"Services for Computer Supported Telecommunications Applications (CSTA)Phase III" Standard ECMA-269 7th Edition, Dec. 2006 p. i-xii, 1-750 http://www.ecma-international.org/publications/standards/Ecma-269.htm
"Protocol for Computer Supported Telecommunications Applications (CSTA)Phase III" Standard ECMA-285 2nd Edition Jun. 2000, p. i-viii, 1-404 http://www.ecma-international.org/publications/standards/Ecma-285.htm (Continued)

*Primary Examiner* — Duc C Ho
(74) *Attorney, Agent, or Firm* — Pearl Cohen Zedek Latzer Baratz LLP

(57) ABSTRACT

System and method for transmitting interaction metadata messages, for example, computer telephony integration (CTI) messages, from one or more network end points and/or from a central network device to a recording system using a light-weight interaction metadata protocol, for example, a light-weight CTI protocol, over one or more communication services.

19 Claims, 3 Drawing Sheets

(56) References Cited

OTHER PUBLICATIONS

"XML Protocol for Computer Supported Telecommunications Applications (CSTA)Phase III" Standard ECMA-323 4th Edition, Dec. 2006, p. i-x 1-582 http://www.ecma-international.org/publications/standards/Ecma-323.htm.

"Session Management, Event Notification, and Computing Function—Services Amendments for ECMA-348" ECMA Technical Report TR/90 1st Edition Dec. 2005, p. i, 1-16 http://www.ecma-international.org/publications/techreports/E-TR-090.htm.

"Using CSTA for SIP Phone User Agents (uaCSTA)" ECMA Technical Report TR/87 1st Edition, Jun. 2004, p. i-v, 1-77, http://www.ecma-international.org/publications/techreports/E-TR-087.htm.

"Designing an Object Model for ECMA-269 (CSTA)" ECMA Technical Report TR/88 1st Edition, Jun. 2004, p. i-ii, 1-29 http://www.ecma-international.org/publications/techreports/E-TR-088.htm.

"Scenarios for Computer Supported Telecommunications Applications (CSTA)Phase III" ECMA Technical Report—TR/82 Dec. 2000, p. i-iv, 1-80, http://www.ecma-international.org/publications/techreports/E-TR-082.htm.

"Glossary of Definitions and Terminology for Computer Supported Telecommunications Applications (CSTA)Phase III" ECMA Technical Report TR/72 3rd Edition, Jun. 2000, p. i-viii 1-25 http://www.ecma-international.org/publications/techreports/E-TR-072.htm.

"Migrating to CSTA phase III" ECMA Technical Report TR/80, Jun. 2000, p. I-II, 1-21 http://www.ecma-international.org/publications/techreports/E-TR-080.htm.

"Using ECMA-323 (CSTA XML) in a Voice Browser Environment" ECMA Technical Report TR/85 Dec. 2002, p. i-ii, 1-26, http://www.ecma-international.org/publications/techreports/E-TR-085.htm.

"Services for Computer Supported Telecommunications Applications (CSTA)Phase II" Standard ECMA-217, Dec. 1994. p. i-iv 1-145. http://www.ecma-international.org/publications/standards/Ecma-217.htm.

"Protocol for Computer Supported Telecommunications Applications (CSTA)Phase II" Standard ECMA-218 Dec. 1994 p. i-iv, 1-195, http://www.ecma-international.org/publications/standards/Ecma-218.htm.

'Services for Computer Supported Telecommunications Applications (CSTA)Phase I' Standard ECMA-179, Jun. 1992, p. I-vi, 1-65, http://www.ecma-international.org/publications/standards/Ecma-179.htm.

"Protocol for Computer Supported Telecommunications Applications (CSTA)Phase I" Standard ECMA-180, Jun. 1992, p. i-iv, 1-125 http://www.ecma-international.org/publications/standards/Ecma-180.htm.

"Scenarios for Computer Supported Telecommunications Applications (CSTA)Phase II" ECMA Technical Report TR/68 Dec. 1994, p. i-ii 1-56 http://www.ecma-international.org/publications/techreports/E-TR-068.htm.

Donovan S. "The SIP Info Method", RFC2796, Oct. 2000 http://www.ietf.org/rfc/rfc2976.txt?number=2976.

Rosenberg J. et al "SIP: Session Initiation Protocol" RFC2796 Jun. 2002 http://www.ietf.org/rfc/rfc3261.txt?number=3261.

Rosenberg J. "The Session Initiation Protocol (SIP) Update Method" RFC3311, Sep. 2002 http://www.ietf.org/rfc/rfc3311.txt?number=3311.

Donovan S et al. "Session Timer in the Session Initiation Protocol (SIP)" RFC4028, Apr. 2005 http://www.ietf.org/rfc/rfc4028.txt?number=4028.

Box et al "Web Services Eventing (WS-Eventing)" W3C Member Submission Mar. 15, 2006 p. 1-39 http://www.w3.org/Submission/WS-Eventing/.

* cited by examiner

SYSTEM AND METHOD FOR TRANSFERRING INTERACTION METADATA MESSAGES OVER COMMUNICATION SERVICES

BACKGROUND

Current development of the Voice over Internet Protocol (VoIP) technology leverage a broad array of contact center applications and flexible call-handling capabilities. In addition, contact channels have expanded from voice to include other applications such as, email, web, fax and the like. Computer telephony integration (CTI) allows integration and coordination of all customer contact channels, e.g., voice, email, web and fax with computer systems.

Currently all CTI information is provided by a central CTI server and current CTI standards require knowledge of the entire call flow. Therefore, these standards cannot be supported by endpoints or other distributed components of a contact center. A solution for providing light-weight metadata information, for example, CTI information, which relates to interactions of various media types between different entities of contact center environments or telephony-recording environments is highly required.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
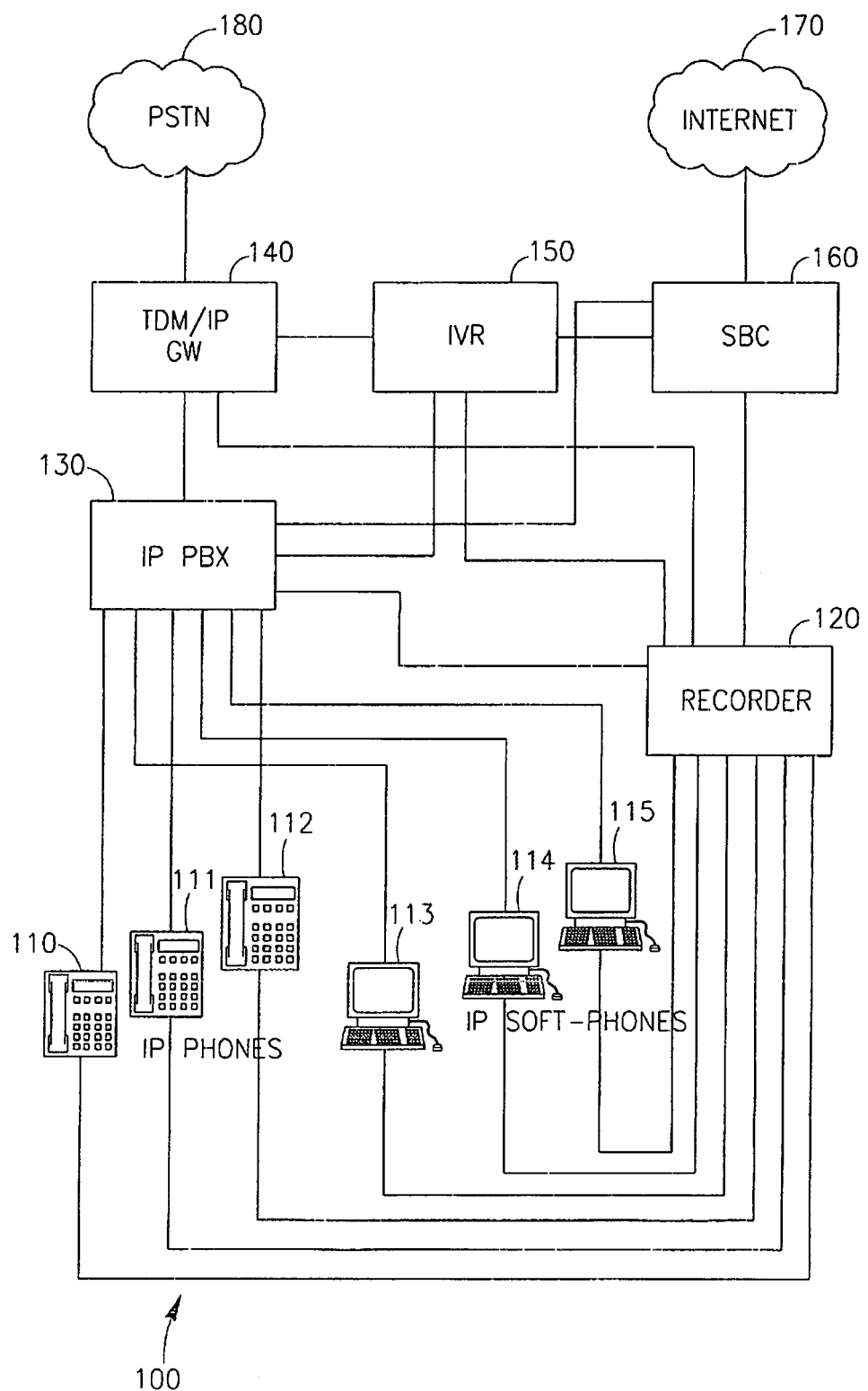
FIG. 1 is a high-level block diagram of an exemplary telephony recording environment according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF DEMONSTRATIVE EMBODIMENTS OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of devices" may include two or more devices.

Although embodiments of the invention are not limited in this regard, the term "contact center" as used herein may be used throughout the specification and claims to describe any centralized or distributed locations used for collective handling of multi-media information, for example, telephone calls, faxes, e-mails and the like, or any other centralized or distributed locations used for the purpose of receiving, transmitting and controlling a large volume of information.

Embodiments of the present invention are directed to a system and a method for delivering interaction-metadata information (IMI), such as, CTI information that confronts with the challenges of recordings in contact centers, particularly distributed contact centers. Embodiments of the present invention are further directed to a system and a method for delivering interaction-metadata information (IMI), such as, CTI information related to client-agent sessions or interactions in client-agent recording environments, e g., recording of telephonic and computer-based interactions with customers such as telephone calls, e-mails, chat sessions, collaborative browsing and the like.

Although embodiments of the invention are not limited in this regard, the terms Interaction Metadata Information (IMI) or Interaction Metadata Messages (IMM) as used herein may be used throughout the specification and claims to describe metadata information, for example, CTI information, which relates to a communication interaction, such as a voice interaction, instant messaging, web collaboration or any kind of data transfer, such as, video, faxes, e-mail, and the like. IMM and/or IMI may be provided by "IMM reporting component" or "IMM reporting entity" which may be used throughout the specification and claims to describe any network end point, central network device, or any component, entity or device that may report metadata information including entities or devices which have limited resources such as hardware, memory, processing power and the like.

Although, in the description below, for ease of explanation exemplary embodiments of light-weight CTI information protocol are described in detail with reference to embodiments of the present invention, it should be understood to a person skilled in the art that embodiments of the present invention may be used in a variety of other light-weight interaction-message protocols based on other existing protocols or propriety protocols.

The light-weight CTI information protocol described in detail with reference to embodiments of the present invention may address the issue of receiving CTI information from a plurality of distributed components including from receiving the CTI information from endpoints of the network, such as telephone devices. It should be understood to a person skilled in the art that the light-weight CTI information protocol described below according to embodiments of the invention may be likewise used in to deliver CTI information by a centralized CTI server.

Although embodiments of the invention are not limited in this regard, the terms "CTI reporting component" or "CTI reporting entity" as used herein may be used throughout the specification and claims to describe any network end point, network edge point, central network device, or any component, entity or device that may report interaction metadata information, such as, CTI information in the way described with reference to embodiments of the present invention. For example, network end point may include Internet Protocol (IP) telephones, IP soft-telephone endpoints, smart media gateways, Interactive Voice Response (IVR) server, Session Border Controllers (SBCs), or any other end-device of a communication network. Central network device may include packet telephony switch, central CTI server or any other central network component.

Although embodiments of the invention ale not limited in this regard, the term "light-weight CTI information" as used herein may be used throughout the specification and claims to describe CTI information which may be provided by CTI reporting entities including entities or devices which have limited resources such as hardware, memory, processing power and the like. Light-weight CTI information as used herein may further refer to limited information, for example, limited in size or limited by carrying only partial information and not information of the entire call or session flow. Although embodiments of the invention are not limited in this regard, the terms "call" or "interaction" as used herein may be used throughout the specification and claims to describe a communication session between two or more components, at least one of which is a device or component of a recording environment such as, VoIP telephone call, an instant messaging session, chat, video conference or any other multi-media session or interaction in a multi-media communication environment.

Embodiments of the present invention may leverage or make use of known in the art technologies, applications and protocols such as, Session Initiation Protocol (SIP), Web Service (WS) or Hypertext Transfer Protocol (HTTP), to receive light-weight CTI information form all CTI capable components in particular from endpoints or contact center components which are incapable to support comprehensive CTI information due to lack of resources Reference is now made to FIG. 1, which is a high-level block diagram of an exemplary telephony-recording environment according to embodiments of the present invention. Telephony-recording environment 100 may represent, for example, a distributed contact center environment according to some embodiments of the present invention. Telephony-recording environment 100 may include IP telephones 110, 111 and 112, IP soft-telephones 114, 115 and 116, packet telephony switch 130, for example, IP Private Branch exchange (PBX), gateway 140, for example, Time-Division Multiplexing-IP (TDM/IP) gateway, IVR 150 and SBC 160, all capable of communicating and transferring CTI information to a recording system 120 as described in detail below.

Alternatively or additionally, environment 100 may include one or more e-mail servers (not shown), one or more mail web collaboration servers and any other suitable servers and endpoint computational devices to enable other types of interactions, such as instant messaging, chat, video conference, e-mail fax or any other multi-media session or interaction in a multi media communication environment.

Although in the exemplary illustration of FIG. 1, three IP telephones and three IP soft-telephones are shown, it should be understood to a person skilled in art that the invention is not limited in this respect and according to embodiments of the present invention, telephony-recording environment 100 may include any number of end-devices. In addition any other suitable end-devices may be used, for example, cellular IP phones, PDAs old any other end-devices which are able to communicate with recording system 120.

According to some embodiments of the invention, telephony-recording environment 100 may be connected to a plurality of communication networks, for example, the Internet network 170 and a public switched telephone network (PSTN) 180 to receive and transmit information such as telephone calls, from/to those networks.

For example, incoming telephone calls from, fixed-line telephones or mobile telephones may be routed through PSTN 180 and may be delivered to gateway 140. Gateway 140 may forward the calls to packet telephony switch 130 to be routed to one of end-devices 110, 111, 112, 113, 114 or 115, to IVR 150 for an interaction voice session with the caller or directly to recording system 120 for recording the audio data of the session. According to embodiments of the present invention, IMI, such as CTI information may be transferred using IMM light-weight protocol or CTI light-weight protocol over communication services, protocols or software applications such as, for example, SIP, WS or HTTP from gateway 140, IVR 150 or SBC 160 directly to recorder 120.

Incoming calls or sessions may be routed through from Internet network 170 and may be delivered to SBC 160. SBC 160 may forward the calls to, for example, IVR 150, IP PBX 130 or directly to recording system 120. Outgoing calls, for example, from IP telephones 110-112 or from IP soft-telephones 113-115 may be routed through TDM-IP Gateway 140 or SBC 160 to external networks such as PSIN 180 and Internet network 170.

Although in the exemplary illustration of FIG. 1, a plurality of elements, devices or component of telephony-recording environment 100 are shown, it should be understood to a person skilled in the art that the invention is not limited in this respect and according to embodiments of the present invention telephony recording environment 100 may be any contact center, call center of any other communication environment which may include any suitable elements or numbers of elements or components that may transfer CTI information according to embodiments of the present invention. For example, environment 100 may include one or more e-mail servers, one or more mail web collaboration servers and any other suitable servers and endpoint computational devices to enable other types of interactions, such as instant messaging, chat, video conference, e-mail, fax or any other multi-media session or interaction in a multi-media communication environment.

According to embodiments of the present invention, components of telephony-recording environment 100 may be capable of transferring CTI information by using a light-weight CTI information protocol as described in detail below. The light-weight CTI information protocol described in the present invention allows distributed components, entities or end-devices incapable of supporting comprehensive CTI information handling to carry light-weight CTI information For example, use of the light-weight CTI information may enable a recording system to receive CTI information directly from endpoints components:

According to some embodiments of the invention, light-weight CTI information, also referred to herein as light-weight CTI messages, may be provided by different components of telephony-recording environment 100 over communication services, protocols or software applications such as, for example, SIP, HTTP or WS. Any other communication services, protocols or software applications may be used for transferring or carrying, light-weight CTI information as is described in detail in embodiments of the present invention.

For example, in the exemplary illustration of FIG. 1, packet telephony switch 130 may report light-weight CTI information over SIP, IP telephones 110-112 may report light-weight CTI information over WS, and soft IP telephones 113-115 may report light-weight CTI information over SIP. Some devices or entities may report or send light-weight CTI information to recording system 120 over a plurality of communication services, protocols or software applications which are supported by each of the devices, for example, gateway 140, SBC 160 and IVR 150 may report CTI events by using SIP, HTTP or by using WS. Other communication services, protocols or software applications may be used.

According to embodiments of the present invention, Extensible Markup Language (XML) may be used to define content information of the IMM, for example, the light-weight CTI messages. However, it should be understood to a person skilled in the art that any other method or language may be used. Light-weight CTI messages may include an event reporting as is described in detail below.

Although the scope of the present invention is not limited in this respect, the light-weight CTI messages may be separated or categorized into a plurality of categories, packages or groups. Each package or category of messages may use a unique transferring scheme, for example, a unique XML scheme and a unique identifier which may allow recording system 120 to track the origin and/or the flow of a light-weight CTI message.

Each package, category or group of messages may correspond to the type of the message. For example, basic CTI event package may include basic call events, such as, call establishment and call tear-off including its related information, such as, call identification, participants, or other information and advanced CTI event package may relate to complex scenarios such as, transfers and conferences and the related information According to some embodiments of the present invention, the categories or groups of messages may include call state messages, agent status messages and device status messages.

Call state messages may be sent by a CTI reporting component when, for example, the status of a call has changed. A plurality of such messages may be sent during the lifetime of a call. Non-limiting examples of call states may include "idle state", "call initiated state", "hold state", "started state", "provisional state", "end state", "redirection state", "update call information state" and "call failure state". Agent status messages may be sent by a CTI reporting component when, for example, the state or status of an agent has changed Non-limiting examples of activities or statuses of an agent may include "agent logged in", "agent logged off", "agent ready", "agent not ready" and "agent working after a call"

Device status messages may be sent by a CTI reporting component when, for example, the status of a specific device has changed or when status of one of the endpoints reported by a device has changed Non-limiting examples of device status indications may include "device in service", "device off service" and "normal status".

Figure 2:
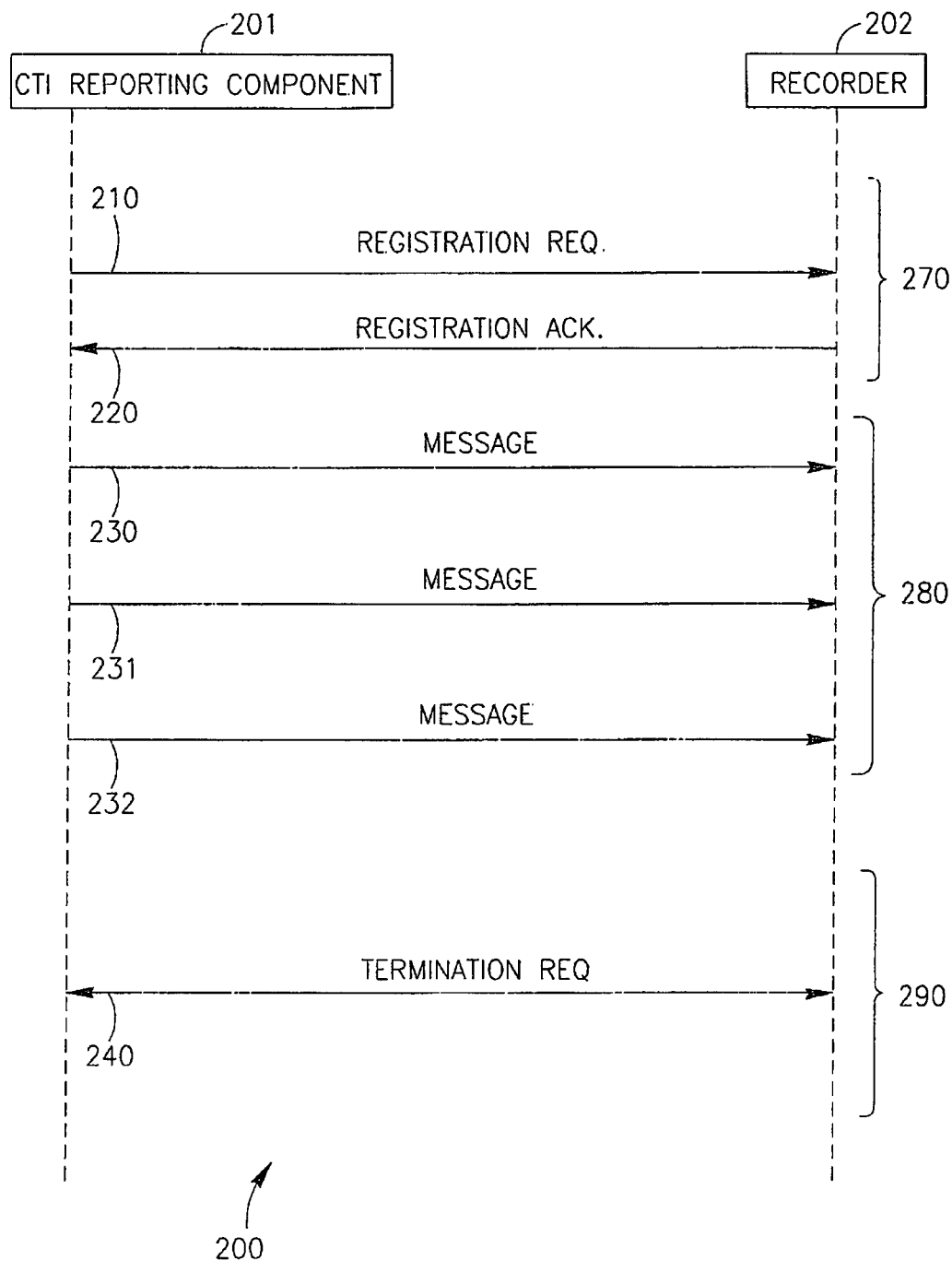
FIG. 2 is a sequence diagram of a generic messages flow according to embodiments of the present invention.

Reference is now made to FIG. 2, which is a sequence diagram of a genetic message flow according to an embodiment of the present invention. A general message flow 200 depicts a flow of transactions and/or messages delivered between a CTI reporting component 201, e.g., one of the IP telephones or IP soft telephones 110-115 of FIG. 1 and recorder 202, e.g., recording system 120 of FIG. 1. According to some embodiments of the invention, message flow 200 may be mapped to or implemented by any method, application or protocol which may allow networked components to create connection to one another, over which they may exchange streams of data, for example, SIP, WS or HTTP. Any other protocol or method that may carry XML messages may be used. Message flow 200 may include a session establishment stage 270, a reporting stage 280 and a session termination stage 290.

Session establishment stage 270 may include a registration request from CTI reporting component 201 to recorder 202 as indicated by arrow 210. Registration request 210 may include a list of CTI packages ox groups of messages supported by CTI reporting component 201. Registration request 210 may further include information of the connection and/or other information regarding CTI reporting component 201. Session establishment stage 270 may further include a registration acknowledge from recorder 202 to CTI reporting component 201 as indicated by arrow 220. Registration acknowledge 220 may include validation of registration request 210 from recorder 202. The acknowledge message may include a list of the CTI packages or groups of messages required by recorder 202. Registration acknowledge message 220 may further include information of the connection and/or information regarding recorder 202

Although the scope of the present invention is not limited in this respect, prior to session establishment stage 270 the address of recorder 202 may be provided to CTI reporting component 201, for example, by way of configuration.

Reporting stage 280 may include transfer of Light-weight CTI events messages between CTI reporting component 201 and recorder 202 as indicated by arrows 230, 231 and 232. CTI reporting component 201 may notify recorder 202 of any event or status change by transferring light-weight CTI events messages.

According to some embodiments of the invention, the CTI event may be presented as XML document inside the light-weight CTI event message. The light-weight CTI event message may also carry an identifier for each event package. The identifier may enable the call or session to be tracked by recorder 202. In some embodiments of the invention, a unique identifier may be allocated to each light-weight CTI event message by CTI reporting component 201. Moreover, in order to support a complete call tracking, an additional global identifier may be used in order to associate a number of call segments together.

Although in the exemplary flow diagram of FIG. 2, three reporting lines 230-232 are shown, it should be understood to a person skilled in art that the invention is not limited in this respect and according to embodiments of the present invention messages flow sequence may include any suitable numbers of reporting lines which may represent light-weight CTI event messages reporting.

Although the scope of the present invention is not limited in this respect, CTI reporting components, such as CTI reporting component 201 may report light-weight CTI event messages and recorder 202 may reconstruct the full call flow. This may allow the CTI reporting component to be free from any special requirements, for example, large memory space or high processing power Session termination stage 290 may include a disconnection or termination of the session established in session establishment stage 270 between CTI reporting component 201 and recorder 202 as indicated in termination request 240. The termination may be performed using the same protocol that has been used to establish the session, for example, SIP, WS or HTTP. Termination request 240 may be initiated by CTI reporting component 201 ox by recorder 202.

Although the scope of the present invention is not limited in this respect, CTI reporting components, such as CTI reporting component 201, may establish a session with recorder 202 and not vice versa, this may allow a CTI reporting component to be located in remote branches and to sit behind firewalls and/or Network Address Translation (NAT) devices.

Although the scope of the present invention is not limited in this respect, WS events framework may be used to provide information from WS enabled CTI reporting components to recording systems. According to some embodiments of the present invention, CTI reporting component 201 may connect to recorder 202 using WS protocol. The registration message of the WS may provide recorder 202 with a list of light-weight CTI packages supported by the CTI reporting component As a response recorder 202 may subscribe to the light-weight CTI packages that he wishes to receive. CTI reporting component 201 may send light-weight CTI messages via a WS notification port (API) according to recorder 202 subscription. Session termination may be made by both sides, CTI reporting component 201 may send a disconnection request and recorder 202 may send an unsubscribe request to CTI reporting component 201.

Using WS subscription may require from both CTI reporting component 201 and recorder 202 to be host applications. In some embodiments of the invention, if CTI reporting component 201 is not able to support the subscription mechanism, recorder 202 may use the response of the connection request in order to subscribe the light-weight CTI packages. In addition, recorder 202 may use the response of the "keep alive" mechanism of WS in order to send the unsubscribe request, such a method may require from CTI reporting component 201 to periodically send "keep alive" requests. If CTI reporting component 201 will not send such requests, recorder 202 may end the connection ungracefully.

Although the scope of the present invention is not limited in this respect, SIP events framework may be used to provide information from SIP enabled CTI reporting components to recording systems as is described in detail below with reference to FIG. 3.

Although the scope of the present invention is not limited in this respect, a CTI reporting entity which may use persistent HTTP connections in order to provide CTI information. CTI reporting component 201 may send an HTTP connect request to recorder 202 and may notify recorder 202 about the supported light-weight CTI packages. Recorder 202 may use the connection request response in order to subscribe the Lightweight CTI packages, and the "keep alive" mechanism in order to send the unsubscribe request. This may require from CTI reporting component 201 to periodically send "keep alive" requests. If CTI reporting component 201 will not send such requests, recorder 202 may end the connection ungracefully. CTI reporting component 201 may send light-weight CTI packages via HTTP POST. While using HTTP connection, HTTP headers, such as, Cookie and Set-Cookie may be used for carrying session id information, for example, according to RFC 2109.

Figure 3:
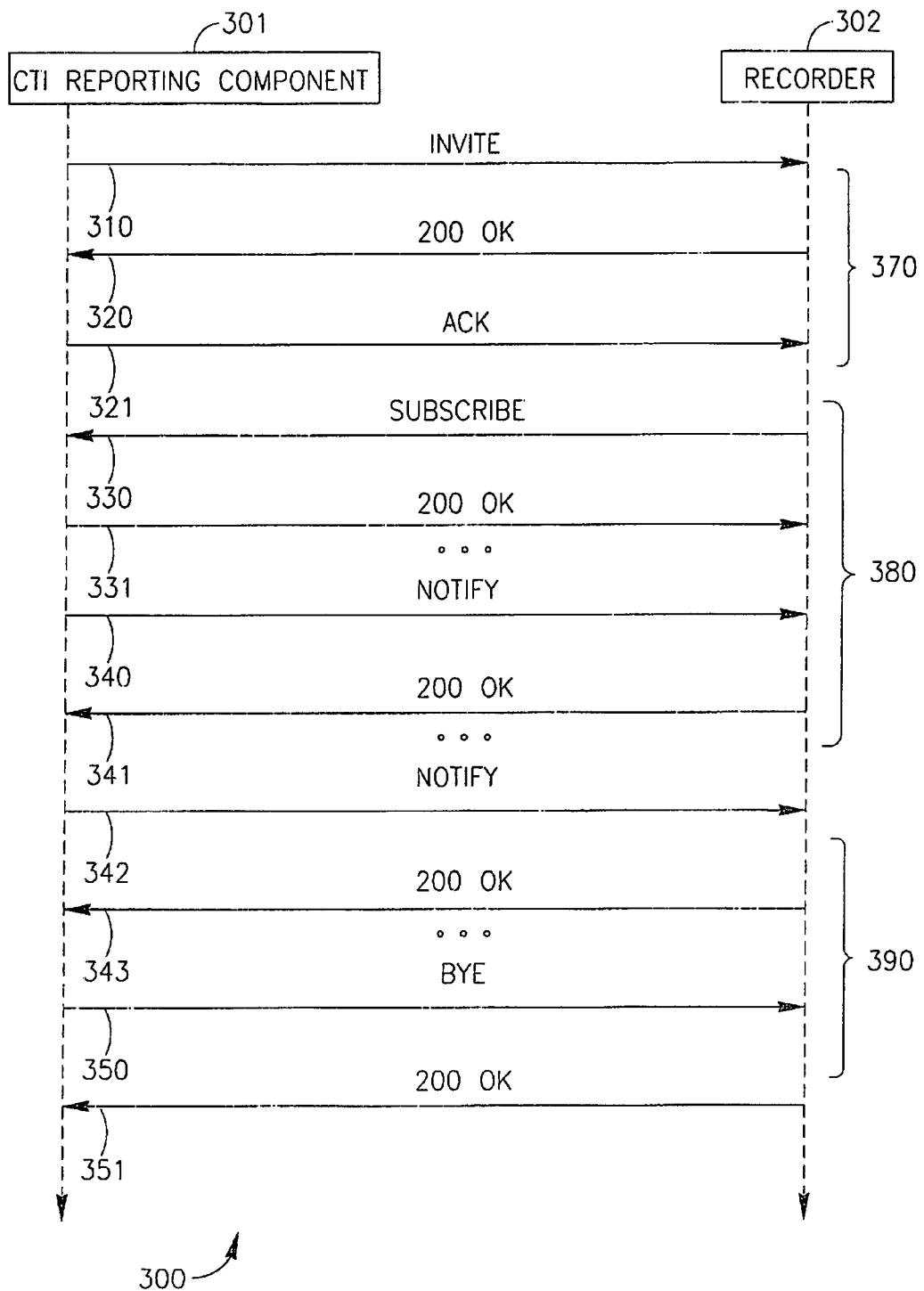
FIG. 3 is a sequence diagram of a SIP mapping of the generic messages flow of FIG. 2 according to an embodiment of the present invention.

Reference is now made to FIG. 3, which is a sequence diagram of a SIP mapping of the genetic message flow of FIG. 2 according to an embodiment of the present invention Message flow 300 depicts a flow of transactions and/or messages delivered between a CTI reporting component 301, which include SIP capabilities, e.g., one of the IP phones or IP soft phones 110-115 of FIG. 1 and recorder 302, e.g., recording system 120 of FIG. 1. Message flow 300 may include a session establishment stage 370, a reporting stage 380 and a session termination stage 390.

Session establishment stage 370 may include a SIP "invite" message from CTI reporting component 301 to recorder 302 as indicated in line 310, which may be mapped, for example, from registration request 210 of FIG. 2. SIP "invite" message 310 may contain "allow-events" header which may specify which event packages are supported by CTI reporting component 301. Recorder 302 may respond with a SIP "200 OK" message as indicated in line 320, which may be mapped, for example, from registration acknowledge 220 of FIG. 2. SIP "200 OK" message 320 may carry a "required events" header which may include a list of events that recorder 302 may wish to receive.

Session establishment stage 370 may include a SIP acknowledge message from CTI reporting component 301 to recorder 302 as indicated in line 321. Sending SIP acknowledge message 321 to recorder 302 may complete session establishment stage 370.

Reporting stage 380 may include a subscription from recorder 302 to CTI reporting component 301 as indicated in line 330. The subscription may be performed by sending a SIP "subscribe" message from recorder 302 to CTI reporting component 301 which may be followed by a SIP "200 OK" message from CTI reporting component 301 to recorder 302 as indicated in line 331.

Reporting stage 380 may include reporting of CTI events by sending a SIP "notify" message from CTI reporting component 301 to recorder 302 as indicated in lines 340 and 342, which may be mapped, for example, from reporting lines 230-232 of FIG. 2. CTI reporting component 301 may notify recorder 302 of any event or regarding any status change by transferring light-weight CTI event messages. "Notify" messages 340 and 342 may contain an "event headed" that may specify the event package and may carry an XML document describing the relevant state or status. Recorder 302 may acknowledge event reception of each SIP "notify" message by sending a SIP "200 OK" message as indicated in lines 341 and 343.

Session termination stage 390 may include a termination of the session established in session establishment stage 370 between CTI reporting component 301 and recorder 302, which may be mapped for example, from un-registration request 240 of FIG. 2. The termination may be performed by issuing a SIP "bye" message by either CTI reporting component 301 or a recorder 302 as indicated in line 350, and may be followed by a SIP "200 OK" message from recorder 302 or CTI reporting component 301 as indicated in line 351.

Although in the exemplary flow diagram of FIG. 3, two "notify" messages 340 and 342 are shown, it should be understood to a person skilled in art that the invention is not limited in this respect and according to embodiments of the present invention flow sequence 300 may include any suitable number of "notify" messages which may represent light-weight CTI event messages reporting.

Although in the exemplary sequence diagram of FIG. 3, one CTI reporting component and one recorder are shown, it should be understood to a person skilled in art that the invention is not limited in this respect and according to embodiments of the present invention any suitable number of CTI reporting components may transfer messages to any suitable number of recorders or recording systems by using the methods described in the present invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system within a telephony-recording environment, the system comprising:
   a plurality of Internet Protocol (IP) telephone endpoints and a recording system configured for recording data of telephone calls from said IP telephone endpoints;
   wherein:
   the system is configured for establishment of communication sessions between the recording system and a plurality of the IP telephone endpoints using a light-weight CTI protocol over a plurality of communication services;
   the recording system is configured to subscribe to receive CTI messages from the IP telephone endpoints by sending subscription requests to the IP telephony endpoints; and
   each of said IP telephone endpoints is configured to transmit computer telephony integration (CTI) messages directly to the recording system during an established one of said communication sessions;
   the messages include one or more of call state messages, agent status messages and device status messages; and
   the recording system is configured to use the messages to reconstruct the call flow.

2. The system of claim 1 further comprising:
   a central network device to transmit CTI messages directly to the recording system.

3. The system of claim 1 further comprising: one or more gateways that transmit CTI messages to the recording system using the light-weight CTI protocol.

4. The system of claim 1, wherein said communication services are session initiation protocol, hypertext transfer protocol or web service.

5. The system of claim 1, wherein said CTI messages comprise CTI information associated with the status of said IP telephones.

6. The system of claim 1, wherein said light-weight CTI messages comprise state data of said IP telephones.

7. The system of claim 1, wherein said light-weight CTI messages are defined by an extensible markup language.

8. The system of claim 1, wherein said CTI messages comprise an identifier to define the content of said messages.

9. The system of claim 1 wherein the session establishment comprises the sending of a registration request from a telephone endpoint to the recording system.

10. A method for transmitting computer telephony integration (CTI) messages relating to telephone calls comprising:
    establishing respective communication sessions between a plurality of Internet Protocol (IP) telephony endpoints and a recording system using a light-weight CTI protocol over one or more communication services;
    receiving at one or more of said telephony endpoints from a recording system a request to subscribe to receive CTI messages from the IP telephone endpoint; and
    transmitting CTI messages directly from one or more Internet Protocol (IP) telephones to the recording system, wherein the messages include one or more of call state messages, agent status messages and device status messages.

11. The method of claim 10, wherein said communication services are session initiation protocol, hypertext transfer protocol or web service.

12. The method of claim 10, wherein said light-weight CTI messages comprise status data of the IP telephones.

13. The method of claim 10, wherein said light-weight CTI messages comprise state data of the IP telephones.

14. The method of claim 10, wherein said light-weight CTI messages are defined by an extensible markup language.

15. The method of claim 10, wherein said light-weight CTI messages comprise an identifier to define the content of said messages.

16. The method of claim 10 wherein the session establishment comprises the sending of a registration request from a telephone endpoint to the recording system.

17. A method implemented in a recording system, the method comprising:
    establishing respective communication sessions with a plurality of Internet Protocol (IP) telephony endpoints using a light-weight CTI protocol over one or more communication services;
    subscribing to receive CTI messages from each of the telephone endpoints by sending subscription requests to the IP telephony endpoints;
    receiving CTI messages directly from one or more of said Internet Protocol (IP) telephony endpoints during one of said sessions, wherein the messages include one or more of call state messages, agent status messages and device status messages; and
    using the messages to reconstruct call flow.

18. The method of claim 17 wherein establishing communications sessions comprises receiving at the recording system a registration request from a telephone endpoint.

19. A system within a telephony-recording environment, the system comprising:
    a plurality of Internet Protocol (IP) telephone endpoints and a recording system configured for recording data of telephone calls from said IP telephone endpoints;
    wherein:
    the system is configured for establishment of communication sessions between the recording system and a plurality of the IP telephone endpoints using a light-weight CTI protocol over a plurality of communication services, wherein the establishment comprises the sending of a registration request from a telephone endpoint to the recording system;
    each of said IP telephone endpoints is configured to transmit computer telephony integration (CTI) messages directly to the recording system during an established one of said communication sessions;
    the messages include one or more of call state messages, agent status messages and device status messages; and
    the recording system is configured to use the messages to reconstruct the call flow.

* * * * *